May 20, 1952 E. E. DAVIS 2,597,622
GARDEN TRACTOR
Filed Aug. 24, 1946 4 Sheets-Sheet 1
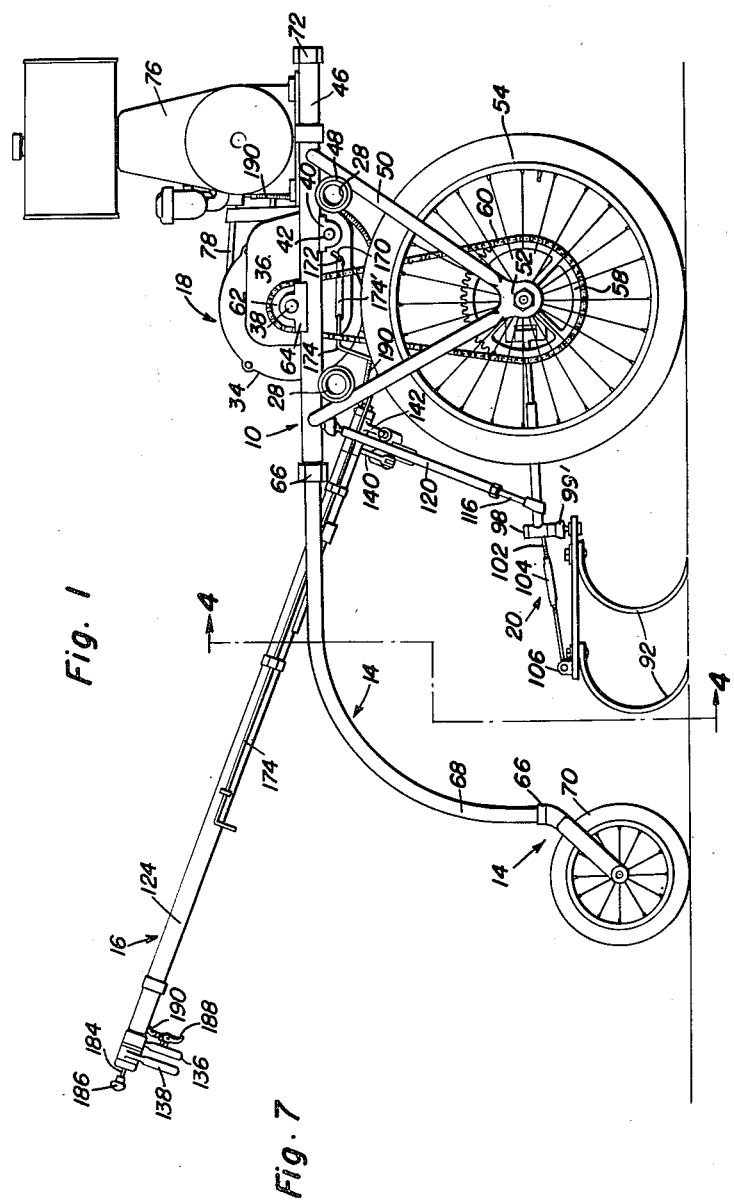
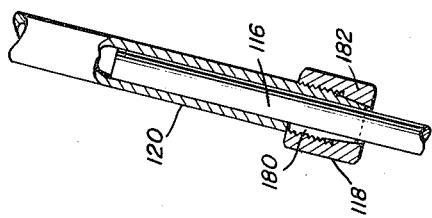
Inventor
Ellis E. Davis
By *Clarence A. O'Brien and Harvey B. Jackson*
Attorneys May 20, 1952  E. E. DAVIS  2,597,622
GARDEN TRACTOR Filed Aug. 24, 1946  4 Sheets-Sheet 2

Inventor
Ellis E. Davis

By *Clarence A. O'Brien*
*and Harvey B. Jacobson*
Attorneys

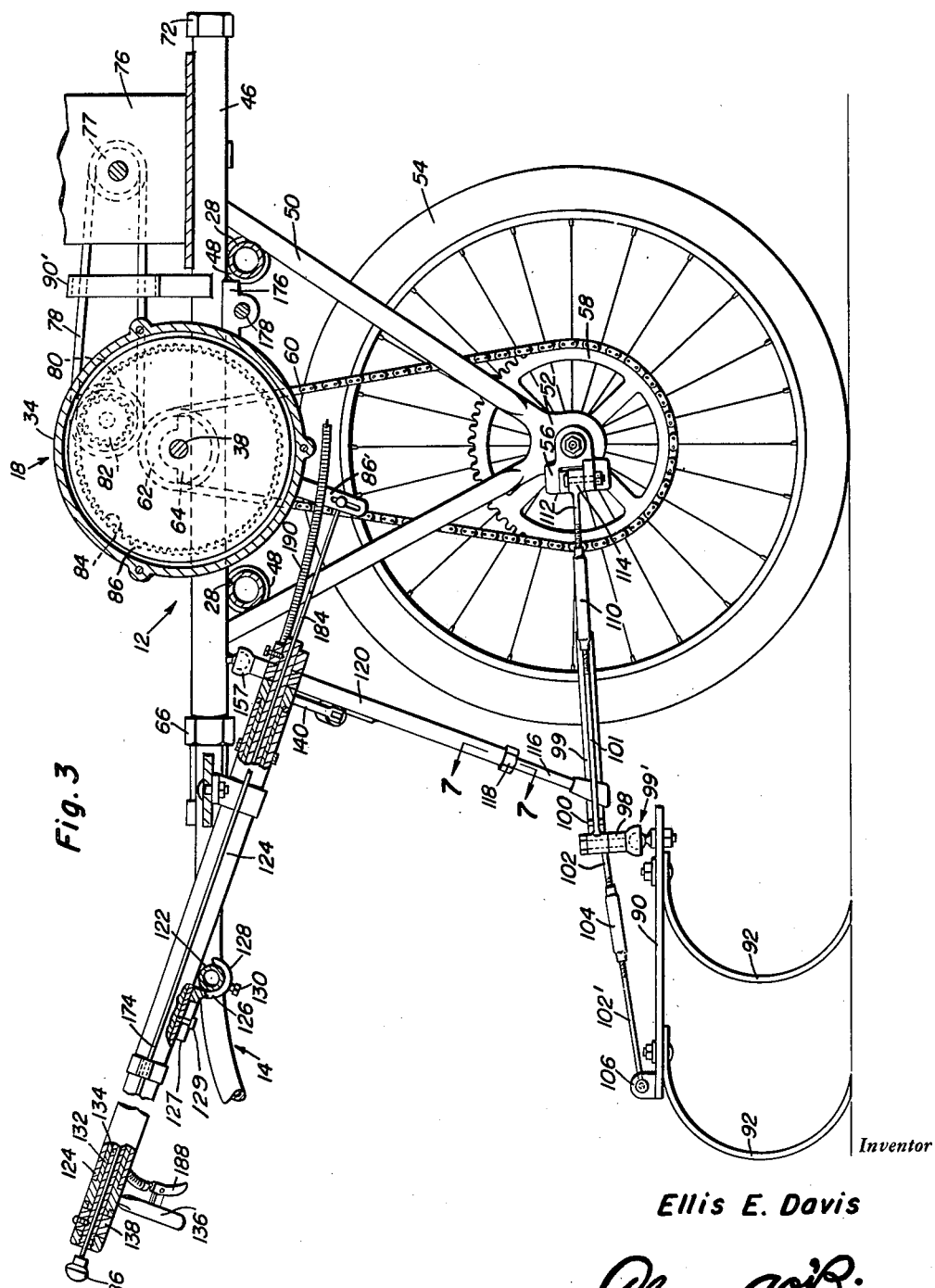

Inventor
Ellis E. Davis

Patented May 20, 1952

2,597,622

UNITED STATES PATENT OFFICE 2,597,622

GARDEN TRACTOR

Ellis E. Davis, Williamsport, Pa.

Application August 24, 1946, Serial No. 692,771

8 Claims. (Cl. 97—48)

The present invention pertains to novel and useful improvements in a garden tractor and more specifically resides in providing an adaptable device for cultivating gardens and similar purposes.

The primary purpose of this invention is to develop a farming power driven implement wherein improved and readily adjustable means are provided for manipulating a pair of ground cultivating units.

An important object of the invention is to provide a power cultivating tool wherein a simplified and improved form of power control clutch is built into the device.

Another important aim of the invention consists in constructing an apparatus in accordance with the foregoing objects, wherein a power means is provided for adjusting the width of the wheels of the tractor to adapt them to different types of cultivation and working of a garden.

Yet another important purpose of the invention contemplates the designing of a tractor in conformity with the preceding objects, wherein the cultivating unit may be simultaneously adjusted in synchronism with a power adjustment of the width of the wheels of the machine.

An additional important purpose of the invention consists in providing an apparatus conforming to the aforesaid objects having a convenient and efficient control system.

Still another aim of the invention is to provide a power device which is adapted for ready conversion from use with cultivating or gardening implements to use with lawn mowers, rollers and the like.

Yet another important object of the invention resides in fabricating a machine in conformity with each of the foregoing objects wherein it is constructed of a plurality of readily detachable and easily assembled units, is efficient for the purposes intended, is durable and inexpensive.

These, together with various other objects of the invention which will later become apparent as the following description proceeds, are attained by my device, one embodiment of which has been illustrated by way of example only, in the attached drawing, wherein:

Figure 1 is a side elevational view of the tractor;

Figure 3 is an enlarged side view of a main portion of the tractor frame with parts broken and parts in section;

Figure 7 is a detail view in vertical section, being taken substantially upon the line 7—7 of Figure 3.

Figure 2:
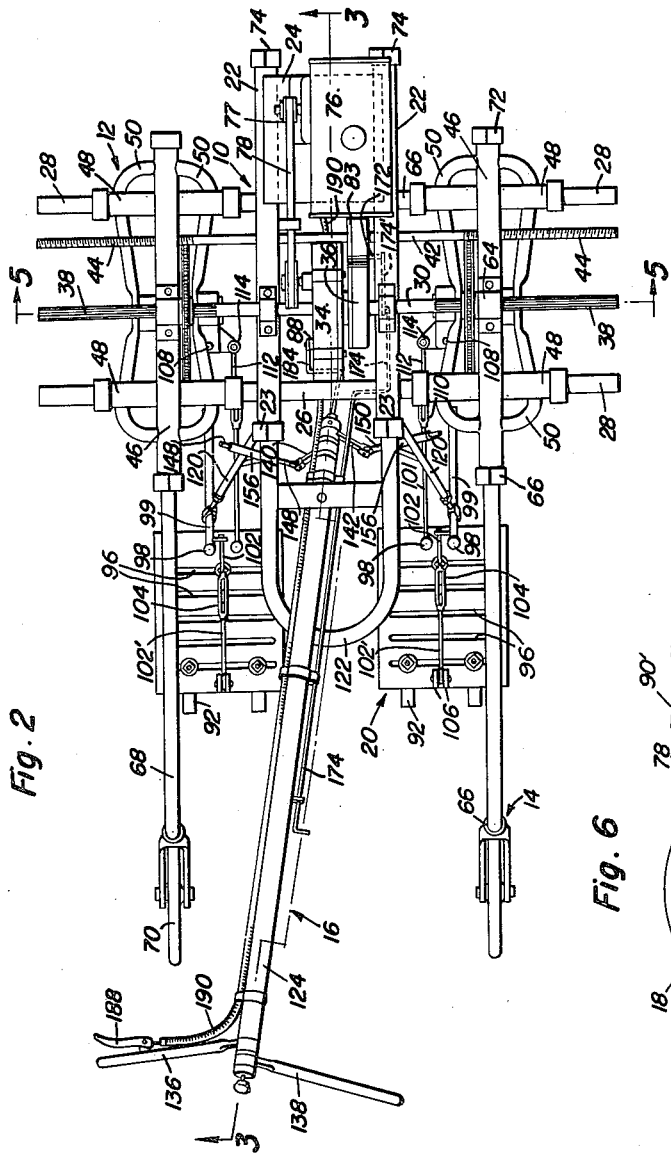
Figure 2 is a top plan view of the device.

Reference is first made to Figures 1 and 2 of the attached drawings, wherein 10 designates generally a unitary frame assembly of the invention, 12 indicates generally a detachable wheel unit of the device, 14 designates a caster wheel support, 16 designates the manual control mechanism of the apparatus, 18 identifies generally the clutch and gearing assembly of the apparatus while 20 identifies in general a cultivating unit.

As shown best in Figure 2, the frame unit 10 is formed by a pair of parallel, longitudinally extending tubular members 22 upon one end of which are rigidly secured as by welding or other fastening means, a base member 24 forming a support for an engine as set forth hereinafter. Extending laterally and transversely beneath the frame members 22 and preferably rigidly secured thereto as by welding or the like, are a pair of longitudinally spaced, parallel rods 26 whose ends terminate in shafts 28 for a purpose to be set forth later. A transversely extending power take-off shaft 30 is journalled in bearings 32 which are rigidly secured upon the upper surface of the tubular frame members 22 and extends through the gearing casings 34 and 36 which are mounted between the side members 22, and which will be later described. The shaft 30 has its extremities provided with a key-way or spline, indicated at 38. Extending through the gear casing 36 and through suitable bearings 40 rigidly attached beneath the frame members 22 is an auxiliary shaft 42, having its extremity threaded as at 44 for a purpose to be later set forth.

Figure 4:
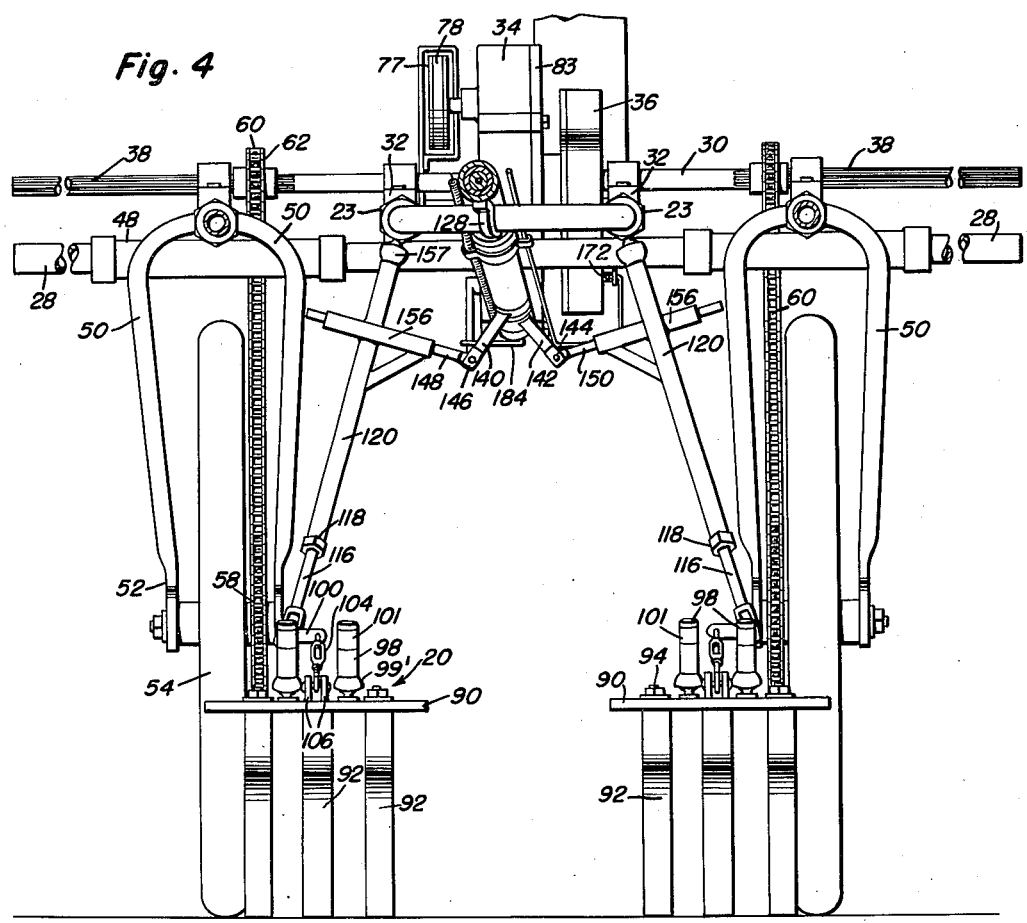
Figure 4 is a rear elevational view, parts being shown in section, of the control mechanism.

Attention is now directed more specifically to Figures 3 and 4, wherein a wheel unit 12 is more clearly disclosed. The wheel unit consists of a longitudinally extending bar 46 beneath which are rigidly secured a pair of parallel bearing sleeves 48 which are arranged to be detachably received upon the parallel extensions or spindles 28 of the frame members. Extending from points adjacent the opposite ends of the longitudinal bar 46, are a pair of bifurcated yoke-like members 50 whose lower extremities are united to form a hub portion 52. The axle or spindle (not shown) of a wheel 54 is journaled in the hub portion 52. The yoke hub 52 is provided with a bearing bracket 56, Figure 3, for a purpose to be later set forth, while the spindle or axle of the wheel 54 has a sprocket 58 rigidly secured thereto, this sprocket being connected by a driving chain 60 with a driving sprocket 62 whose hub is journalled in a bearing bracket 64 rigidly attached to the upper surface of the longitudinally extending bar 46. From the foregoing, it may be seen that the wheel unit is formed as a self-contained unit, which may be easily attached to and removed from the supporting spindles 28 carried by the frame member 10, while the driving gear 62 has its hub portion, not shown, adapted for sliding and detachable engagement with the key-way or spline 38 of the driving shaft 30.

As shown best in Figures 1 and 2, a pair of caster wheel supporting means 14 are detachably connected as at 66 to the rearward extremities of the tubular longitudinal bars 46. These supporting members preferably consist of L-shaped frame members 68, whose downwardly turned lower extremities detachably receive caster wheels 70 of any conventional design.

It may be noted that the forwardly extending extremities of the longitudinal members 46 are provided with detachable connections 72 while the corresponding ends of the tubular members 22 are provided with similar connections 74, the connections 72 and 74 constituting convenient attaching means for supporting a lawn mower or the like, not shown, from the front end of the tractor.

Figure 5:
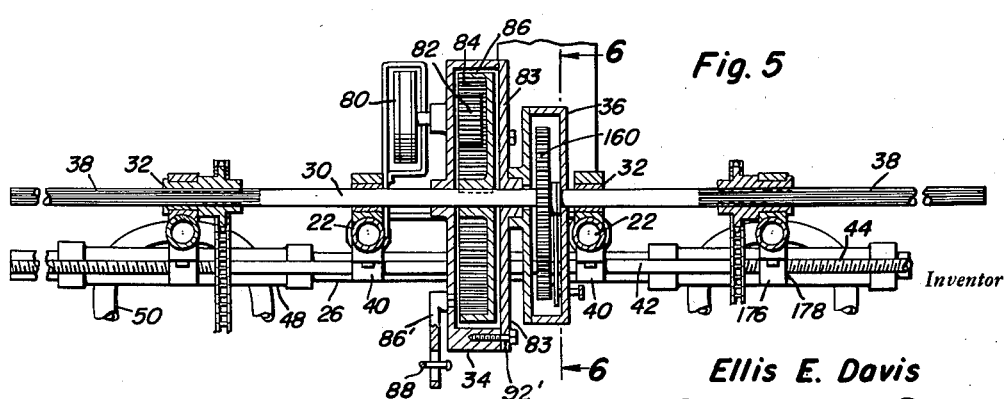
Figure 5 is a vertical transverse section view taken substantially along the plane of line 5—5 of Figure 2.

Attention is now directed to the clutch and power driving means of the tractor, as shown best in Figures 2, 3 and 5. An internal combustion engine, of known and conventional type, indicated at 76 is mounted upon the base plate 24 in a detachable manner and is provided with a driving pulley 77, and is connected by a belt 78 with a driven pulley 80 which is carried by a cover plate 82 of the gear casing 34. The pulley 80 has secured thereto a spur gear 82 which is in continuous mesh with an internal gear 84 carried by an annular drum 86 rigidly attached to the drive shaft 38. As will be understood, the gear casing 34 together with its cover 83 is freely rotatable and supported by the driving shaft 38, so that suitable oscillation of the casing 34 as by means of a crank 86' and the rod 184 will cause the spur gear 82 and its driving pulley 80 to move in an orbit about the internal gear 84, to thereby adjust and vary the tension of the belt 78 in a manner which will be fully apparent from a study of Figure 3. Suitable guide members 90' supported in any convenient manner from the frame 10, are provided as a guard or shield for the belt, when the same has been loosened in order to disengage the driving engagement of the motor or engine 76 from the driving shaft 38, when the casing 34 is manipulated as above set forth in order to constitute a power control clutch. In order to permit a certain limited manual adjustment of the clutch, and in order to compensate for wear in the belt and the like, the cover plate 83 may be provided with elongated peripheral slots 92' within which fastening means may be positioned, for securing the cover to the casing 34 in adjusted relation.

It may thus be readily seen that when the rod 184 and crank 86' are properly manipulated by means of the knob 186 to oscillate the casing 34, the belt 78 may be tensioned whereby the engine 76 is caused to drive the power shaft 38, and by means of the sprocket 62 and 58 together with driving chain 60, produce a desired rotation of the tractor wheels 54.

Attention is now directed to Figures 2, 3 and 4, showing in more detail the cultivating unit 20. A tool carrier plate 90 has adjustably secured thereto a plurality of agricultural implements 92 of any desired type, which are adjustable laterally of the carrier plate 90 as by means of fastening means 94 slidable laterally in a plurality of support slots 96. At its forward end, the carrier plate 90 is provided with a pair of upstanding standards or lugs 98 swivelly secured thereto and upon which are pivoted a pair of parallel rods 99 and 101. The upstanding lugs 98 are connected to the carrier plates by universal joint connections 99. The rod 99 is formed with an integral, outstanding lug 100, upon which is pivoted an adjusting rod 102, having a turnbuckle 104 and having its opposite end pivoted to a pair of lugs 106 carried by the rear end of the plate 90. As will be evident, proper manipulation of the turnbuckle 104, will adjust the length of the rod 102 and 102', and will thereby vary the inclination of the carrier plate 90 relative to the rods 99 and 101. The rod 99 has its forward end provided with an aperture 108 while the rod 101 has a screw threaded connecting means 110 which unites the rod 101 with an extension thereof 112 whose outer extremity is apertured as at 114. The rods 99 and 101 are pivotally connected by means of the apertures 108 and 114 to the corresponding apertures of the bracket member 56 rigidly formed upon the hub portion 52. As will be evident, proper manipulation of the adjusting means 110 will shorten or lengthen rod 101 relative to the length of rod 99', and will thereby, because of the parallelogram extending between the posts 98 and the apertures 108, 114 (see Figure 2), result in transverse movement of the carrier plate 90 relative to the hub bracket 56, whereby the cultivator tools 92 may be adjusted laterally of the row which is being cultivated. The rod 99 is formed with an upwardly extending arm 116 which is detachably secured as by a coupling 118 to a shaft 120 in a manner to be now set forth.

Attention is now directed more specifically to the manual control means of the tractor, which is indicated generally at 16 and is shown more clearly in Figures 2, 3 and 4. At their rear extremities, the frame members 22 are coupled as at 23 with a U-shaped, tubular frame extension 122. As shown best in Figure 3, a tubular control post 124 is provided upon its under surface with a bracket member 126 whose inturned, lower edge 128 is adapted to partially embrace the curved, bight portion of the U-shaped member 122, and is adapted to be slidable thereon in guided relation, and to be secured in adjusted position, laterally thereof as by means of an adjusting screw 130. It is to be further noted that member 126 is longitudinally adjustable for limited adjustment relative to the post 124 by means of the slot 127 and adjusting bolt 129. The tubular post 124 is thus adjustably and rigidly secured to the frame member 10 of the tractor and constitutes a handle for guiding the same during its operation. The lateral adjustment of the post 124, is for the purpose of permitting the operator of the tractor to follow the same upon either side thereof as convenience may dictate as when plowing a furrow or the like. Journalled within the tube 124, are a pair of concentric shafts 132 and 134, whose upper extremities have rigidly secured thereto, operating levers 136 and 138 respectively. At their lower ends, these shafts are provided with operating arms 140 and 142 respectively which are swively connected as at 144 and 146 to operating rods 148 and 150. Freely slidable upon the rods 148 and 150, are sleeves 156 to which are rigidly secured transversely thereof the aforementioned rods 120, which latter are pivoted as by ball and socket joints 157 to the tubular frame member 22.

From the foregoing, the operation of the control mechanism will be now apparent. When the lever 136 or lever 138 is pivoted, the corresponding tubular shaft 132 or 134, and the corresponding arms 140 and 142 are rotated in cooperation therewith thereby causing a combined pivoting and reciprocating movement of the corresponding rods 148 or 150. By means of this movement, sleeves 156 together with rods 120, are caused to move transversely upon rods 148 and 150, whereby the depending rods 120 are moved in a preselected direction and about their universal joint connections 157, and by means of the attachment 116, effect a transverse movement of the carrier plate 90 and the rods 99 and 101, about their pivot points 108 and 114, as seen best in Figure 2. By this means, the cultivating unit may be adjustable laterally of the tractor during plowing without change in the direction of movement of the tractor.

Figure 6:
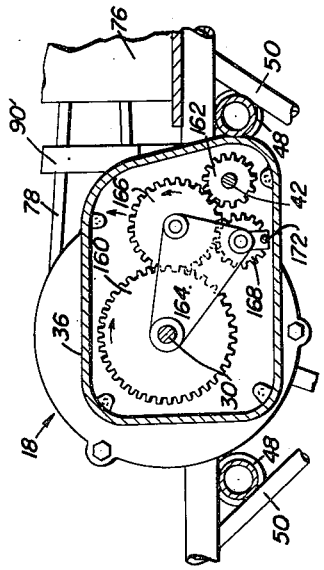
Figure 6 is a vertical longitudinal sectional view taken substantially along the plane of line 6—6 of Figure 5.

The attention is next directed to the power operated means for varying the width of the tractor wheels. As shown more clearly in Figures 2, 5 and 6, the gear casing 36 is freely supported by the power shaft 30 and the auxiliary shaft 42, between the side members 22 of the frame 10. Within the casing 36, is enclosed a driving gear 160 rigidly attached to the driving shaft 30, while a gear 162 constituting a driven gear is rigidly attached to the leg shaft 42. An idler gear carrier plate 164 is pivotally mounted upon the drive shaft 30 and has journalled thereon an idler gear 166 in constant mesh with the driving gear 160 and a second idler gear 168 in continuous engagement with the idler gear 166. As will be seen from Figure 6, the carrier plate 164 may conveniently be formed as a triangular member and the gears are so proportioned that in the lowermost position of the carrier plate as viewed in Figure 6, the driving connection is made between gears 160, 166 and 162, while in the uppermost position of the carrier plate, the driving connection extends between gears 160, 166, 168 and 162. This arrangement permits a reversal of drive between shafts 30 and 42 for a purpose to be later set forth, and it will be noted that the gears may be disengaged in their intermediate position, whereby the driving engagement between shafts 30 and 42 is broken. Extending through a suitable arcuate slot 170 in the side wall of the casing 36, is an operating pin 172 to which may be attached any suitable operating linkage indicated as 174 and 174' in Figures 1 and 2. By means of the linkage, a driving connection, may be directly or reversably established between the driving shaft 30 and the leg shaft 42, at the will of the operator for a purpose to be now set forth.

Depending from the longitudinal members 46 at an appropriate point thereon, is an integral boss 176, provided with an internally screw threaded bore 178 adapted for engagement by the threaded portions 44 upon the shaft 42. It will thus be seen that as the shaft 42 is rotated, the oppositely threaded portions 44 by means of their engagement with the threaded bores 178, produce a lateral movement of the wheel units 12 upon their supporting spindles 28 and thereby effect an adjustment of the width between the wheels. As will be readily perceived, this adjustment may be easily effected while the tractor is in motion, and without altering any existing adjustments of the tools thereon. Also, as the wheel units are moved laterally of the tractor frame, they produce a corresponding shifting of the cultivating unit by means of the pivotal engagement of the bracket 56 with the rods 99 and 101.

Attention is now directed to Figure 7, for a clearer showing of the frictional engagement between the operating rod 120 and the arm 116 secured to the cultivating unit. The operating rod 120 is provided at its lower end with a longitudinally split portion indicated at 180, to form resilient fingers which embrace the upper end of the rod or arm 116. The fastening means 118 is provided with a tapering inner surface 182, adapted to engage the correspondingly tapered lower end of the tubular member 120, whereby upward movement of the member 118 upon the member 120 results in a radial compression of the finger portions to thereby yieldingly retain the arm 116.

As shown in Figures 2 and 3, a rod 184 is disposed centrally of the tube 124 and the concentric shafts 132 and 134, and is provided at its upper protruding extremity with an actuating knob or button 186 for the purpose of reciprocating the rod. At its lower end, the rod 184 is pivotally connected to the actuating linkage 88' for the purpose of operating the power clutch indicated generally at 18.

A manual operating means 188 is attached to one of the levers such as 136, and has an operating shaft 190 which is adapted to engage the carburetor throttle valve of the internal combustion engine 76 for the purpose of regulating the power thereof.

I claim as my invention:

1. A garden tractor or the like including a frame, wheel units detachably mounted on said frame, power drive and gearing means carried by the frame and connected to said wheel units for driving the same, a cultivator unit pivoted to each wheel unit, and a control means for laterally adjusting each cultivator unit, said control means being carried by said frame and including a tubular post carried by said frame, a pair of tubular concentric shafts axially positioned within said post each shaft including a laterally extending handle portion at the top end and a laterally extending angulated arm at the bottom end thereof, and means interconnecting said angulated arm with said cultivator unit, said last mentioned means including a rod pivotally secured at one end to said cultivator and swivelly secured at its other end to said frame, a laterally extending sleeve rigidly secured to said rod adjacent the swivel end thereof, and a link slidable in said sleeve and swivelly attached to one of said angulated arms.

2. A garden tractor or the like including a frame, wheel units detachably mounted on said frame, power drive and gearing means carried by said frame and connected to said wheel units for driving the same, a cultivator unit pivoted to each wheel unit, a U-shaped frame structure secured to said frame, and a control means for laterally adjusting each cultivator unit, said control means including a tubular post laterally adjustable on the web portion of said U-shaped structure, a pair of tubular concentric shafts axially positioned within said post each shaft including a laterally extending handle portion at the top end and a laterally extending angulated arm at the bottom end thereof, and means interconnecting said angulated arm with said cultivator unit, said last mentioned means including a rod pivotally secured at one end to said cultivator and swivelly secured at its other end to a leg portion of said U-shaped structure, a laterally extending sleeve rigidly secured to said rod adjacent the swivel end thereof, and a link slidable in said sleeve and swivelly attached to one of said angulated arms.

3. A garden tractor including a frame, a pair of wheel units detachably secured upon said frame, power means for laterally adjusting said wheel units on said frame, a cultivator unit pivoted to each wheel unit for lateral adjustment therewith, and manual control means carried by said frame for individually adjusting each cultivator unit laterally of said frame, said control means including a tubular post carried by said frame, a pair of tubular concentric shafts axially positioned within said post each shaft including a laterally extending operating handle portion at the top end and a laterally extending angulated arm at the bottom end thereof, and means interconnecting said angulated arm with said cultivator unit, said last mentioned means including a rod pivotally secured at one end to said cultivator and swivelly secured at its other end to said frame, a laterally extending sleeve rigidly secured to said rod adjacent the swivel end thereof, and a link slidable in said sleeve and swivelly attached to one of said angulated arms.

4. In a garden tractor having a frame, wheel supporting means mounted on said frame, and a cultivating unit attached to one of said wheel support means, said cultivating unit consisting of a tool carrier, upstanding lugs swivelly mounted on said tool carrier, parallel support bars pivotally attached to said lugs and to wheel support means, means for adjusting the length of one of said parallel bars for varying the lateral spacing of said tool carrier relative to said wheel support unit, additional means interconnecting the other of said parallel bars with said tool carriage for vertically adjusting said tool carrier relative to said parallel bars, said additional means for vertically adjusting the tool carrier including a first rod pivoted to the other of said parallel bars, a second rod pivoted to said tool carrier, and means adjustably uniting the free ends of said rods.

5. In a garden tractor having a frame, wheel supporting means mounted on said frame, and a cultivating unit attached to one of said wheel support means, said cultivating unit consisting of a tool carrier, upstanding lugs swivelly mounted on said tool carrier, parallel support bars pivotally attached to said lugs and to wheel support means, means for adjusting the length of one of said parallel bars for varying the lateral spacing of said tool carrier relative to said wheel support unit, additional means interconnecting the other of said parallel bars with said tool carriage for vertically adjusting said tool carrier relative to said parallel bars, and manually operable control means for individually adjusting said cultivating unit laterally of said tractor, said additional means for vertically adjusting the tool carrier including a first rod pivoted to the other of said parallel bars, a second rod pivoted to said tool carrier, and means adjustably uniting the free ends of said rods.

6. In a garden tractor having a frame, wheel supporting means mounted on said frame, and a cultivating unit attached to one of said wheel support means, said cultivating unit consisting of a tool carrier, upstanding lugs swivelly mounted on said tool carrier, parallel support bars pivotally attached to said lugs and to wheel support means, means for adjusting the length of one of said parallel bars for varying the lateral spacing of said tool carrier relative to said wheel support unit, additional means interconnecting the other of said parallel bars with said tool carriage for vertically adjusting said tool carrier relative to said parallel bars, and manually operable control means for individually adjusting said cultivating unit laterally of said tractor, said control means including a tubular post carried by said frame, a pair of tubular concentric shafts axially positioned within said post each shaft including a laterally extending operating handle portion at the top end and a laterally extending angulated arm at the bottom end thereof, and means interconnecting said angulated arm with said cultivator unit, said last mentioned means including a rod pivotally secured at one end to said cultivator and swivelly secured at its other end to said frame, a laterally extending sleeve rigidly secured to said rod adjacent the swivel end thereof, and a link slidable in said sleeve and swivelly attached to one of said angulated arms.

7. The combination of claim 1 wherein said additional means for vertically adjusting the tool carrier includes a first rod pivoted to the other of said parallel bars, a second rod pivoted to said tool carrier, and means adjustably uniting the free ends of said rods.

8. The combination of claim 7 wherein said tool carrier includes a plate having spaced transversely extending slots for adjustably engaging a plurality of tools.

ELLIS E. DAVIS.

REFERENCES CITED

The following references are of record in the file of this patent:

UNITED STATES PATENTS

| Number | Name | Date |
|---|---|---|
| 749,157 | Bomberger | Jan. 12, 1904 |
| 1,178,025 | Pritchard | Apr. 4, 1916 |
| 1,220,383 | Wheeler | Mar. 27, 1917 |
| 1,353,156 | Ford | Sept. 21, 1920 |
| 1,368,706 | Derksen | Feb. 15, 1921 |
| 1,374,412 | Waterman et al. | Apr. 12, 1921 |
| 1,538,598 | Skinner | May 19, 1925 |
| 1,547,064 | Nobbs | July 21, 1925 |
| 1,967,283 | Brown | July 24, 1934 |
| 2,173,419 | Johnson | Sept. 19, 1939 |
| 2,322,268 | Zink et al. | June 22, 1943 |

FOREIGN PATENTS

| Number | Country | Date |
|---|---|---|
| 709,213 | France | May 11, 1931 |